March 2, 1965
E. B. HILKER
3,172,033
ELECTRICAL CONTROL APPARATUS
Filed March 6, 1961
2 Sheets-Sheet 1
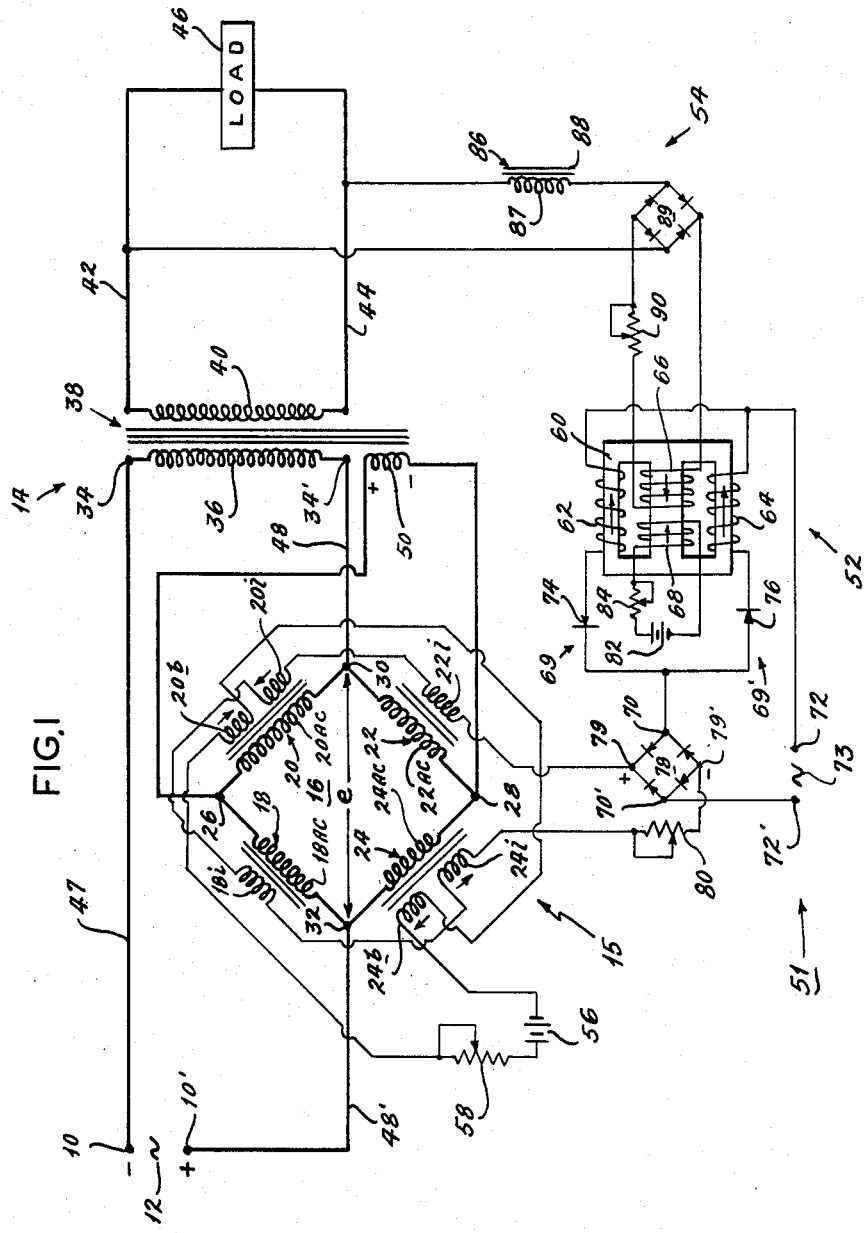
INVENTOR:
ERWIN B. HILKER, DECEASED
BY: ANNAMARY HILKER, ADMINISTRATRIX
BY Gravely, Lieder & Woodruff
ATTORNEYS.

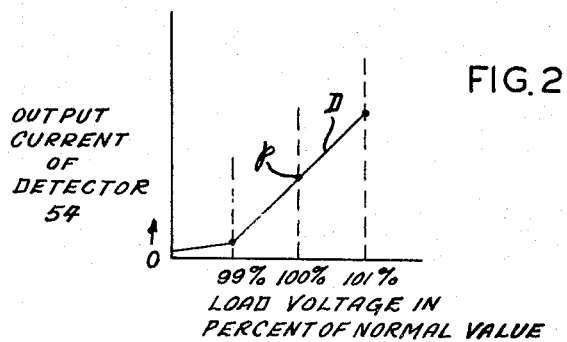
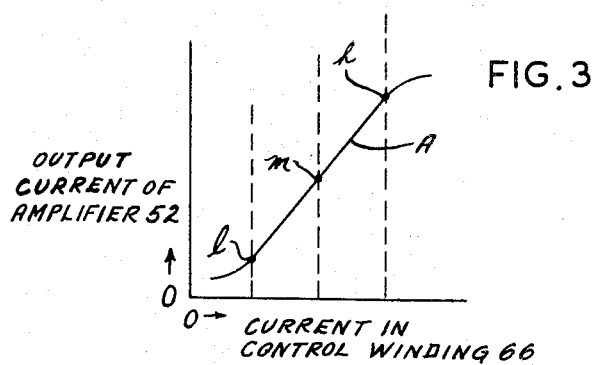
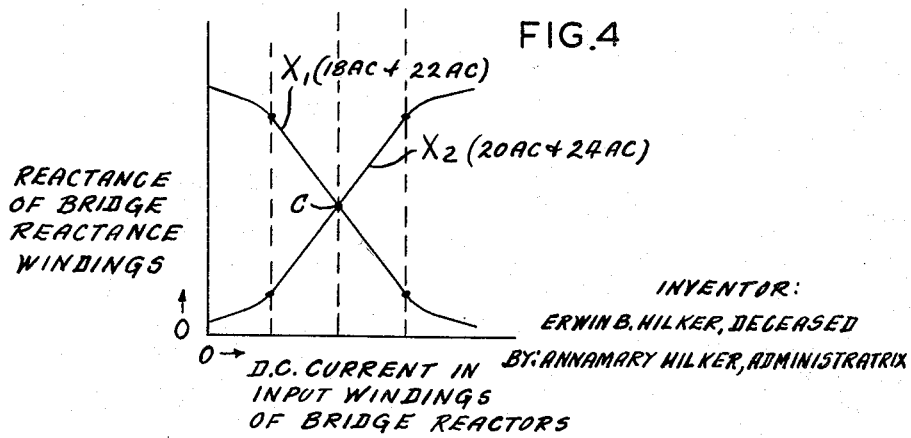

United States Patent Office 3,172,033
Patented Mar. 2, 1965

3,172,033
ELECTRICAL CONTROL APPARATUS
Erwin B. Hilker, deceased, late of St. Louis, Mo., by Annamary Hilker, administratrix, St. Louis, Mo., assignor to Wagner Electric Corporation, St. Louis, Mo., a corporation of Delaware
Filed Mar. 6, 1961, Ser. No. 93,809
17 Claims. (Cl. 323—66)

This invention relates to electrical control apparatus and more particularly to control systems which include saturable reactors for control purposes.

In electrical control systems employing a saturable reactor control device, for example a bridge circuit containing saturable reactors, the bridge circuit is generally controlled by varying the reactance of the reactors in adjacent arms of the bridge in opposite senses. Usually, in order to control the balance of a reactance type bridge circuit over its full control range, or so that it can be unbalanced in both senses, two inversely varying input signals are supplied respectively to input windings of reactors in adjacent arms of the bridge. In such a case, the bridge is balanced when the two signals are equal, unbalanced in one sense when one signal is greater than the other, and unbalanced in the opposite sense when the one signal is less than the other. Another arrangement is used in which the reactors in adjacent arms are biased to equal mid-reactance values, such as by use of bias windings, and a reversible polarity input signal applied to the input windings of the adjacent reactors. With biased reactors in adjacent arms, the direction of bridge unbalance is determined by the polarity of the input signal, and the bridge is balanced when the signal is zero.

Where the balance of the bridge circuit is automatically controlled in response to some variable condition or quantity, and two inversely varying input signals, as mentioned above, are to be used to control the bridge, two condition responsive control devices have been used to supply the input signals to the input windings of the bridge reactors. For example, two condition responsive single-ended amplifiers controlled in opposite senses have been used. A single-ended amplifier is considered herein as one having a single-polarity output, that is, an output which does not reverse its polarity. Also, where the bridge circuit is arranged to be controlled by a reversible polarity input signal applied to the input windings of adjacent reactors, as hereinbefore mentioned, the condition responsive means usually include two single-ended amplifiers, the outputs of which are combined to produce a reversible polarity signal, such as in a double-ended or push-pull amplifier arrangement. If one single-ended amplifier is to be used, special polarity reversing means are required.

In accordance with one embodiment of the present invention, an electrical system including a reactance bridge circuit is provided in which a single-polarity or unidirectional signal can be used to control the balance of the bridge over its full control range, thereby simplifying the bridge control apparatus. This is accomplished in accordance with one aspect of the invention by biasing a reactor in an arm of the bridge to a relatively low reactance value and supplying a single-polarity input signal to that reactor and a reactor in an adjacent arm of the bridge such that the bridge is balanced when the input signal is at a predetermined value, unbalanced in one sense when the input signal is above the predetermined value, and unbalanced in the opposite sense when the input signal is below the predetermined value.

It is therefore an object of the present invention to provide an electrical control device, which includes saturable reactors and reactor control means, which is especially simple and economical in construction.

Another object is to provide a novel electrical control apparatus including a bridge circuit containing saturable reactors which may be controlled over its full control range by a single-polarity signal producing device.

Another object is to provide electrical control system employing a reactance circuit for providing a variable phase adjusting voltage for controlling the output voltage of the system within the predetermined limits wherein the reactance circuit is controlled by condition responsive means requiring relatively few parts.

Another object is to provide a bridge circuit containing saturable reactors wherein the bridge circuit is controllable over its full control range by a condition responsive single-ended amplifier supplying a single-polarity signal to the input windings of the reactors.

Still another object is to provide a bridge control circuit for controlling a saturable reactor type bridge circuit over its full control range wherein the control circuit requires relatively few parts.

A further object is to provide a four-arm bridge circuit having saturable reactance means in each arm thereof wherein the reactances of all four reactance means are varied by a common single-polarity signal and wherein the bridge can be unbalanced in opposite senses in response to the signal.

Further objects and advantages of the present invention will be apparent from the following description, reference being had to the accompanying drawings wherein a preferred embodiment of the present invention is clearly shown.

In the drawings:

FIG. 1 is a schematic diagram of an electrical control system embodying the present invention, FIG. 2 is a chart showing the characteristic curve of the voltage detector 54 of FIG. 1, FIG. 3 is a chart showing the control characteristic curve of the amplifier 52 of FIG. 1, and;

FIG. 4 is a chart with curves showing the reactance values of the reactors of the bridge circuit 16 of FIG. 1 over the control range of the bridge circuit.

There is shown in FIG. 1 an electrical control system including a pair of power input circuit terminals 10 and 10' connected to an alternating current power supply source 12 for supplying power to a power output circuit indicated generally at 14. Connected in series circuit relation between the power input and output circuits is a compensating voltage device 15 including a bridge circuit 16.

The bridge circuit 16 is shown for illustration as including four saturable core reactors 18, 20, 22 and 24, each consisting of a magnetic core carrying a main or reactance winding and an input winding for controlling the saturation of the core and therefore the reactance of the reactance winding. In addition, reactors 20 and 24 each have a bias winding on their cores. The reference numerals of the reactors are also used herein to represent their associated windings, except that the letters "AC" are added to the numerals indicating the reactance windings, the letter "i" added to the numerals indicating the input windings, and the letter "b" added to the numerals indicating the bias windings.

The reactance windings of the four reactors are shown connected together in the form of a Wheatstone type bridge circuit with one in each of the four impedance arms of the bridge. One end of each of the adjacent windings 18AC and 20AC is connected to a bridge corner 26 which serves as one bridge input circuit terminal, while one end of each of the adjacent windings 22AC and 24AC is connected to a bridge corner 28 which serves as the other bridge input circuit terminal. The other end of each of the adjacent windings 20AC and 22AC is connected to a bridge corner 30 which serves as one bridge output circuit terminal, while the other end of each of the adjacent windings 18AC and 24AC is connected to a bridge corner 32 which serves as the other bridge output circuit terminal.

While the bridge circuit 16 is shown including four saturable core reactors with separate cores, other bridge circuit arrangements may be used where desired. For example, in a four-arm bridge circuit, each set of diametrically opposite or non-adjacent reactors may be combined into a single reactor unit by employing a three-legged core with the reactance windings of the set on the outer legs and common input and, where used, bias windings on the center leg. In such case, the bridge contains four saturable reactors to provide two sets of opposite reactors with each set combined into a single reactor unit.

The power output circuit 14 is shown including a pair of power output terminals 34 and 34' connected to opposite ends of a primary winding 36 of a power transformer 38. Transformer 38 has a secondary winding 40 connected by output leads 42 and 44 across a load 46. Power is supplied to primary winding 36 by a supply lead 47 connecting power input terminal 10 to output terminal 34, a supply lead 48 connecting bridge output terminal 30 to power output terminal 34', and a supply lead 48' connecting the other bridge output terminal 32 to power input terminal 10'. With these connections, the output circuit of the bridge is connected in series with the primary winding 36 so that power is supplied to transformer 38 through the bridge circuit 16. If desired, instead of connecting the bridge output terminals 30 and 32 directly to leads 48 and 48', respectively, as shown in the drawing, these terminals may be connected across the primary winding of a coupling transformer (not shown) and the secondary winding of the coupling transformer connected between leads 48 and 48'. In such case, the bridge output circuit is inductively coupled in series circuit relation between the power input and output circuits of the system.

The bridge input terminals 26 and 28 are shown connected across an auxiliary winding 50 disposed on the core of the transformer 38. Auxiliary winding 50 will be considered herein as functioning as a secondary winding for impressing a substantially constant A.C. voltage across the input circuit of the bridge 16.

Bridge circuit 16 will be described herein as providing an A.C. variable phase adjusting or compensating voltage $e$ across its output terminals 30 and 32 which is combined with the A.C. power supply voltage of source 12 for affecting the power output and load voltages. In accordance with the balance conditions of the bridge, the bridge output voltage $e$, with respect to the magnitude of the supply voltage, is substantially ineffectual at bridge balance, aiding the supply voltage when the bridge is unbalanced in one sense, and opposing the supply voltage when the bridge is unbalanced in the opposite sense.

The balance condition of the bridge and its output voltage $e$ at any instant is determined by the relative reactance values of the two sets of opposite reactance windings, the relative reactance values being determined by the relative effective control M.M.F.'s or control ampere-turns of the two sets of reactors. The effective control ampere-turns and resultant control M.M.F. of each reactor of the one set of opposite reactors 18 and 22 is determined by the magnitude of direct current flowing in input windings 18i and 22i. The effective control ampere-turns and resultant control M.M.F. of each reactor of the other set of opposite reactors 20 and 24 is determined by the magnitudes of direct currents flowing in both the bias and input windings of each of these reactors. As indicated by the arrows adjacent the input and bias windings of each of the reactors 20 and 24, the input M.M.F.'s and unidirectional fluxes resulting from current flow in the input windings 20i and 24i oppose the M.M.F.'s and unidirectional fluxes resulting from current flow in the bias windings 20b and 24b, respectively.

Bias windings 20b and 24b are shown connected in series with each other and supplied with current from a current source shown as a battery 56 and a series connected current adjusting potentiometer 58. The bias current flowing in windings 20b and 24b is adjusted such that the reactances of windings 20AC and 24AC are at relatively low reactance values when a minimum or zero value of input current flows in the input windings 20i and 24i.

While the bridge circuit may be controlled in response to one or more of various selected conditions or quantities of a particular electrical system, the bridge circuit 16, in the illustrated embodiment, is controlled in response to small variations in the power output or load voltage. It will be assumed herein that the load voltage is to be maintained substantially constant at its predetermined value or within very small limits in spite of variations in the power supply voltage impressed across power input terminals 10 and 10'. If, for example, the load voltage is to be maintained substantially constant even though the supply voltage is subject to a 10% change in its voltage, the number of turns in auxiliary winding 50 should be approximately 10% of the turns in primary winding 36. In this way, the bridge can be controlled so as to compensate for approximately a plus or minus 10% change in the supply voltage.

In the circuit of FIG. 1, the effective control ampere-turns or control M.M.F.'s of the two sets of opposite reactors of the bridge are varied in accordance with a unidirectional or single-polarity input signal provided by a bridge control circuit indicated generally at 51. Bridge control circuit 51 includes a single-ended amplifier 52 which is controlled in response to the output of a voltage detector 54, the detector providing an output responsive to small variations in the power output or load voltage. As shown, the input windings of all of the reactors of the bridge are shown connected in series with each other in a bridge input winding circuit which is connected to be energized by the output of amplifier 52 to thus control the bridge and its output voltage $e$ in response to variations in the load voltage.

Single-ended amplifier 52 is shown in the drawing for illustration as a self-saturating magnetic amplifier of well-known construction. Amplifier 52 includes a three-legged saturable magnetic core 60 carrying power windings 62 and 64 on the outer legs thereof, and a control winding 66 and a bias winding 68 on the center leg. The two power windings 62 and 64 are connected respectively in branch circuits 69 and 69' with the branch circuits connected in parrallel between an A.C output terminal 70 and an A.C. power input terminal 72. Another output terminal 70' is connected to another power input terminal 72'. An A.C. supply source 73 is shown connected across the power input terminals 72 and 72'. One-way valves or half-way rectifiers 74 and 76 are connected in the branch circuits respectively in series with power windings 62 and 64. Rectifiers 74 and 76 are oppositely poled or related with respect to the supply voltage applied to the power input terminals 72 and 72' so that the rectifiers conduct current on opposite half cycles of the supply voltage and provide an A.C. output at the amplifier output terminals 70 and 70'. Thus, half-wave or intermittent unidirectional current flows in each of the power windings generating unidirectional M.M.F.'s tending to saturate the cores and reduce the impedance of the power windings. The magnetic saturation resulting from these M.M.F.'s is referred to as self-saturation, and the direction or sense of these M.M.F.'s and unidirectional fluxes, as indicated by arrows adjacent the power windings, is referred to as the saturating direction. M.M.F.'s in the opposite sense tend to increase the impedance of the power windings and are known as desaturating M.M.F.'s and have a direction which is referred to as the desaturating direction. The relative directions of the M.M.F.'s and unidirectional fluxes resulting from current flowing in the bias winding 68 and control winding 66 are indicated by arrows adjacent these windings.

The A.C. output of amplifier 52 is rectified by a full-wave bridge rectifier 78, the A.C. output terminals 70 and 70' of the amplifier constituting also the A.C. terminals of rectifier 78. D.C. terminals 79 and 79' of bridge rectifier 78 constitute the D.C. output terminals of amplifier 52. D.C. terminal 79 is connected to one end of bridge input winding 22i while the other D.C. terminal 79' is connected through a series adjustable resistor 80 to one end of bridge input winding 24i. In this way, amplifier 52 supplies unidirectional or single-polarity input current to the series-connected input windings 18i, 20i, 22i and 24i of the bridge circuit.

Bias winding 68 of amplifier 52 is connected to a source of bias current shown as a battery 82 connected to the bias winding through an adjustable resistor 84. The bias winding 68 is connected, in the illustrated example, to produce desaturating M.M.F.'s to bias the amplifier downwardly. The bias current is adjusted so that the amplifier output is at cut-off or at a relatively low value when current in control winding 66 is zero or at a relatively low value.

While other types of known detectors may be used, the voltage detector circuit 54 in the drawing includes a saturable core reactor 86 which acts as a current regulating valve that does not permit an appreciable current to flow therethrough until the voltage applied to it exceeds a predetermined critical value, and then the increase in current flow therethrough is in direct proportion to the increase in voltage above that critical value, as will be explained more fully hereinafter. Detector reactor 86 consists of a reactance coil 87 wound on a saturable magnetic core 88. The detector reactor 86 is connected in series with a full-wave rectifier 89 across the load 46. As shown, coil 87 of the detector reactor has one end connected to power output lead 44 and the other end to an A.C. terminal of the bridge rectifier 89. The other A.C. terminal of rectifier 89 is connected to power output lead 42. The D.C. terminals of rectifier 89 are connected through an adjustable resistor 90 to the opposite ends of amplifier control winding 66. The direct current output of the detector circuit 54 thus flows in control winding 66 to control the direct current output of amplifier 52 in response to small variations in the load voltage. Current flowing in control winding 66 produces saturating M.M.F's so that when the current in winding 66 increases the output current of amplifier 52 increases, and vice versa.

The detector reactor 86 is designed so that the magnetic core 88 saturates when the load voltage is above a predetermined critical value. For values of load voltage above the critical value, the reactor 86 saturates during a portion of each half cycle of the load voltage and the average value of direct current flowing in the control winding 66 of amplifier 52 varies in accordance with variations in the load voltage. When the load voltage is below the predetermined critical value, the reactor core 88 does not saturate and the direct current flowing in control winding 66 is small or negligible.

In FIG. 2, there is shown an input/output characteristic curve D of detector 54 wherein the average D.C output current of the detector is plotted along the ordinate axis of the graph and load voltage in percent of its predetermined desired value plotted along the abscissa axis. Maximum percent change in load voltage from its normal value has been assumed, for the purpose of illustration only, to be 1% as indicated by the graph in FIG. 2. It is seen from curve D that detector reactor 86 will present a high impedance to current flow when the load voltage is below 99% of its desired value, the critical value above which reactor 86 saturates. As the load voltage increases above that critical value, the impedance of reactor 86 decreases and the current output of the detector rapidly increases in direct proportion to the load voltage.

In the discussion of the operation of the system which follows, it will be assumed that the bridge circuit 16 is balanced when the power supply voltage across power input terminals 10 and 10' is at its normal or predetermined value and the load voltage is at its predetermined desired value. With the load voltage at 100% of its normal value, the output current of detector 54 is at a predetermined value indicated by a point $p$ on its characteristic curve D in FIG. 2. This means that a predetermined value of unidirectional current from detector 54 flows in control winding 66 of amplifier 52. As seen in FIG. 3, where the input/output characteristic curve, indicated at A, of amplifier 52 is shown, the amplifier output current value is at an intermediate point such as at a mid-point $m$ on curve A when the detector output is at point $p$ on curve D in FIG. 2. This may be accomplished by properly adjusting the negative bias on amplifier 52 until the output of amplifier 52 is at the relative value represented by the point $m$ on curve A when the detector output is at the relative value represented by the point $p$ on curve D. With the output current of amplifier 52 at point $m$ on curve A, the resulting control ampere-turns or control M.M.F.'s of the four bridge reactors are made equal so that the reactance of all four reactance windings of the bridge are equal and the bridge circuit balanced. As shown in FIG. 4, where curve $X_1$ represents the reactance curve of the one set of opposed reactance windings 18AC and 22AC, and curve $X_2$ the reactance curve of the other set of reactance windings 20AC and 24AC, the reactance value of each of the four reactors is the same and at a mid reactance value indicated at point $c$, the cross-over point of the two reactance curves. When the bridge is balanced, the bridge output voltage $e$ is in effect zero or substantially ineffectual in regard to the power output voltage. In order that the bridge circuit is balanced when the predetermined value of single-polarity current from amplifier 52 (point $m$ in FIG. 3) flows in the input windings of the reactors, the bias current flowing in the bias windings 20b and 24b, which produces M.M.F.'s in opposition to the input M.M.F.'s, is adjusted so that the resultant control M.M.F.'s of the biased reactors 20 and 24 are equal to the resultant control M.M.F.'s of the unbiased reactors 18 and 22.

In operation, if it is now assumed that the load voltage decreases from its 100% of normal value, due, for example, to a decrease in the power input voltage, the output current of detector 54 will decrease from its predetermined value, point $p$ in FIG. 2. This will cause a decrease in the current flowing in the control winding 66 of amplifier 52 and a decrease in the D.C. output current from amplifier 52, its output decreasing from point $m$ in a direction toward a relatively low value $l$ on curve A in FIG. 3. With a decrease in output from amplifier 52, the current flowing in the four input windings 18i, 20i, 22i and 24i of the bridge will decrease so that the resultant control M.M.F.'s of biased reactors 20 and 24 will be greater than the control M.M.F.'s of unbiased reactors 18 and 22. The reactance of windings 18AC and 22AC therefore will be greater than the reactance of windings 20AC and 24AC. This may be seen from FIG. 4 where the reactance values of windings 18AC and 22AC, represented by curve $X_1$, are greater than the reactance values of windings 20AC and 24AC, represented by curve $X_2$, for reactance values to the left of point $c$ on curve $X_1$ and $X_2$. This means that the bridge circuit will be unbalanced and, as indicated in FIG. 1 by the given instantaneous polarity signs adjacent the power input terminals and auxiliary winding 50, the bridge output voltage will be of such phase that the bridge terminal 30 will be positive relative to bridge terminal 32, when input terminal 10' is positive relative to input terminal 10. Thus, the voltage $e$ appearing across bridge output terminals 30 and 32 will aid the power supply input voltage to increase the voltage applied to primary winding 36 of transformer 38. In this way, the bridge output voltage $e$ compensates for the decrease in the supply voltage to maintain the load voltage substantially constant.

On the other hand, if the load voltage begins to increase above its predetermined normal 100% value, for example, due to an increase in the supply voltage, the detector output will increase to a value above point $p$ on its characteristic curve D in FIG. 2. This will cause an increase in the current flowing in control winding 66 of amplifier 52 and an increase in the D.C. output current of the amplifier, its output increasing above point $m$ in a direction toward a relatively high value $h$ on curve A of FIG. 3. With an increase in output from amplifier 52, the current flowing in the four input windings 18$i$, 20$i$, 22$i$ and 24$i$ of the bridge will increase so that the resultant control M.M.F.'s of unbiased reactors 18 and 22 will be greater than the resultant control M.M.F.'s of biased reactors 20 and 24. The reactance of windings 20AC and 24AC will therefore be greater than the reactance of windings 18AC and 22AC. As seen in FIG. 4, the reactance values of 20AC and 24AC, curve $X_2$, are greater than the reactance values of windings 18AC and 22AC, curve $X_1$, for reactance values to the right of point $c$. Under these conditions, the bridge circuit is unbalanced in the opposite sense, the bridge terminal 32 being positive relative to bridge terminal 30 when input terminal 10' is positive relative to input terminal 10. Under these conditions, the voltage $e$ appearing across the bridge output terminals opposes the power supply input voltage. Thus, the bridge output $e$, in this case, compensates for the increase in the supply voltage to maintain the load voltage substantially constant.

It is thus seen that the reactance values of the two sets of opposite bridge reactors, or the reactors in each pair of adjacent arms of the bridge, vary inversely with respect to each other in response to a change in the magnitude of the single-polarity input current flowing in the input windings of the reactors to thereby control the balance conditions of the bridge and the output voltage thereof. The degree and direction of bridge unbalance and the compensating effect of the bridge output voltage $e$ depend upon the magnitude of the single-polarity current flowing in the input windings of the bridge reactors. The bridge circuit 16 is balanced when the single-polarity input current is at a predetermined value (point $m$ on curve A in FIG. 3), unbalanced in one sense when the single-polarity input current is below a predetermined value, and unbalanced in the opposite sense when the single-polarity input current is above that predetermined value.

While the bridge circuit 16 of FIG. 1 has been described herein as providing a variable phase voltage $e$ derived from auxiliary winding 50 which is superposed or combined with the power supply voltage, the function of the bridge circuit 16 can be described as a means for varying the effective ampere-turns on the primary side of transformer 38, as will be apparent to those skilled in the art.

Although auxiliary winding 50 has been described herein as providing the bridge input voltage, any suitable source of voltage may be used to impress an A.C. voltage across the input terminals of the bridge. For example, instead of winding 50, an additional transformer (not shown) can be used. In such case, the additional transformer may have its primary winding connected across the power supply source or power output circuit, and its secondary winding connected between the bridge input terminals.

From the foregoing it is seen that one single-polarity current producing device can be used to vary the reactance of all four reactance windings of the bridge 16 to selectively balance and unbalance the bridge in either sense. Thus, with the control arrangement hereinbefore described, a relatively simple single-polarity current producing control or condition responsive device, such as the single-ended amplifier 52, can be used to control a bridge circuit over its full control range.

It is thus apparent that in an electrical system constructed in accordance with the teachings of the present invention, the reactance of a pair of reactors can be inversely varied by biasing one reactor to a low reactance value relative to the other reactor and supplying single-polarity current to the input windings of both reactors. In this way, one single-polarity current producing device can be used to inversely vary the reactance of a pair of reactors substantially over their full range of effective reactance values, i.e., substantially from their minimum to maximum reactance values.

Where two or more reactors are to be controlled or biased by a common signal, the reactors can be, in many cases, provided with a single coil which links the cores of the reactors instead of providing a separate coil for each reactor. In other words, the bias or input winding means for a plurality of reactors may consist of either a separate winding coil for each reactor core or a common single coil linking the cores, since a single coil linking a plurality of cores is equivalent of separate coils linking individual cores. As will be apparent to those skilled in the art, various well-known physical saturable core reactor constructions are possible.

It is to be understood that the foregoing description and the accompanying drawings have been given only by way of illustration and example, and that changes and alterations in the present disclosure, which will be readily apparent to one skilled in the art, are contemplated as within the scope of the present invention which is limited only by the claims which follow.

What is claimed is:

1. In an electrical control system, a reactor control device comprising a pair of saturable reactors connectable to a voltage source for supplying a variable voltage to circuit points in the system in accordance with the relative reactance values of said reactors, input winding means associated with each reactor of said pair of reactors, bias winding means associated with one of said reactors, and means for inversely varying the reactance of said reactors, said last named means including a source of variable single-polarity current connected in series with said input winding means to supply said single-polarity current to said input winding means, a source of substantially constant direct current connected to said bias winding means to bias said one reactor so that the reactance of said one reactor is at a predetermined minimum value and the reactance of the other of said reactors is at a predetermined maximum value when said single-polarity current is at a predetermined minimum value, the reactance of said one reactor being at a predetermined maximum value and the reactance of said other reactor being at a predetermined minimum value when said single-polarity current is at a predetermined maximum value, and means for varying said single-polarity current to simultaneously inversely vary the reactance of said reactors.

2. In an electrical control system, a pair of saturable reactors connected to a voltage source for providing a variable voltage at circuit points in the system in accordance with the relative reactance values of said reactors, each of said reactors having an input winding, one of said reactors having a bias winding, and means for inversely varying the reactance of said reactors in response to variations in a variable condition of the system comprising means for supplying current of substantially constant magnitude to said bias winding to bias said one reactor to a low reactance value relative to the reactance value of the other of said reactors, a condition responsive device for producing a signal responsive to said variations in said variable condition of the system, a single-ended amplifier having an output circuit connected to the input windings of said reactors to supply current to said input windings, and amplifier control means coupled to said condition responsive device to control the output of said amplifier in response to said signal, said input winding of said one reactor being related to produce magnetic effects in opposition to the magnetic effects produced by said bias winding, the reactances of said one reactor and the other of said reactors being at predetermined minimum and maximum values, respectively, when said current supplies to said input windings is at a predetermined minimum value, the reactances of said one reactor and said other reactor being at predetermined maximum and minimum values, respectively, when said current supplied to said input windings is at a predetermined maximum value.

3. In an electrical control system, a reactor control device comprising a pair of saturable reactors each including an A.C. reactance winding and D.C. input winding means, one of said reactors having D.C. bias winding means, means connecting said reactance windings to an A.C. voltage source for providing a variable A.C. voltage across circuit points in the system in accordance with the relative reactance values of said reactance windings, a source of variable single-polarity current connected to said input winding means to supply single-polarity current so said input winding means of said pair of reactors, means for supplying substantially constant direct current to said bias winding means so that the reactance of the reactance winding of said one reactor is at a predetermined minimum value and the reactance of the reactance winding of the other of said reactors is at a predetermined maximum value when said single-polarity current flowing in said input winding means is at a predetermined minimum magnitude, and means for inversely varying the reactance of said reactance windings including means for varying said single-polarity current above said predetermined minimum magnitude.

4. In an electrical control system, a bridge circuit including a biased saturable reactor connected in an arm of the bridge circuit, and an unbiased saturable reactor connected in an adjacent arm of the bridge circuit, said reactors having input winding means, a source of single-polarity current connected to both of said input winding means for inversely varying the reactance of said reactors, said biased reactor having a lower reactance than said unbiased reactor when said current is below a predetermined value and a higher reactance than said unbiased reactor when said current is above said predetermined value, and means for varying said single-polarity current to unbalance said bridge circuit in one sense when said variable current is at a value above said predetermined value and unbalance said bridge circuit in the opposite sense when said variable current is below said predetermined value, the reactances of said biased and unbiased reactors being at minimum and maximum values, respectively, when said variable current is at a predetermined minimum value, and at maximum and minimum values, respectively, when said variable current is at a predetermined maximum value.

5. In an electrical control system, a bridge circuit having input and output circuits and including a pair of saturable reactors each having a reactance winding and an input winding, one of said reactors having a bias winding, said reactance windings being connected respectively in adjacent arms of the bridge circuit, means for impressing a voltage across said input circuit, and means for controlling the balance of the bridge circuit to provide a variable voltage at said output circuit, said last named means including a source of variable single-polarity current connected to both of said input windings of said reactors, means for supplying current of constant magnitude to said bias winding, said bias winding being related to produce magnetic effects in opposition to the magntetic effects produced by said input winding of said one reactor, the reactance winding of said one reactor having a minimum reactance value and the reactance winding of the other of said reactance windings having a maximum reactance value when said variable current is at a predetermined minimum value, and means for varying said variable current to unbalance said bridge circuit in one sense when said variable current is above a predetermined value and unbalance said bridge circuit in the opposite sense when said variable current is below said last named predetermined value.

6. In an electrical control system having a power output circuit and a power input circuit connected to supply power to the power output circuit, a bridge circuit comprising bridge input and output circuits and including a pair of saturable reactors each having a reactance winding and an input winding, one of said reactors having a bias winding, said reactance windings being connected respectively in adjacent arms of the bridge circuit, means for supplying bias current to said bias winding, means for supplying a voltage across said bridge input circuit, means coupling said bridge output circuit in series circuit relation between said power input and output circuits, condition responsive means for producing a signal responsive to an electrical condition of the system, a single-ended amplifier having an output circuit connected to supply variable single-polarity input current to said input windings of said reactors, and amplifier control means coupled to said responsive means for controlling said input current in response to said electrical condition of the system to unbalance said bridge circuit in one sense when said input current is above a predetermined value and unbalance said bridge circuit in the opposite sense when said input current is below said predetermined value.

7. In an electrical control system, a four-arm bridge circuit comprising two sets of opposed bridge corners and two sets of opposed saturable core reactors, each set of reactors including a pair of reactance windings, input winding means for controlling the reactance of the reactance windings of said sets of reactors, one of said sets of reactors including bias winding means, an A.C. voltage source connected to one of said sets of opposed bridge corners to provide a variable voltage across the other set of opposed bridge corners in accordance with the balance conditions of the bridge circuit, means for supplying bias current to said bias winding means so that the reactance of the reactance windings of said one set of reactors is lower than the reactance of the reactance windings of the other set of reactors in the absence of current flow in said input winding means, and means for supplying a variable single-polarity current to said input winding means to unbalance said bridge circuit in one sense when said variable current is above a predetermined value and unbalance the bridge circuit in the opposite sense when said variable current is below said predetermined value.

8. An electrical control device comprising a bridge circuit including a pair of saturable reactors each including a reactance winding and an input winding, one of said reactors having a bias winding, said reactance windings being connected in adjacent arms of the bridge circuit, and means for inversely varying the reactance of said reactance windings to control the balance of the bridge circuit, said means comprising a source of single-polarity current variable between predetermined minimum and maximum current values, means for connecting said input winding of each of said reactors to said source, means for supplying direct current to said bias winding to cause said reactance winding of said one reactor to have a predetermined minimum reactance value when said single-polarity current is at said predetermined minimum value, said reactance winding of said other reactor having a predetermined maximum reactance value when said single-polarity current is at said predetermined minimum current value, and means for varying said single-polarity current.

9. A four-arm bridge circuit comprising saturable core reactor means including a reactance winding in each arm of the bridge circuit to provide two sets of opposite reactance windings and two sets of opposite bridge corners, at least one input winding associated with each set of reactance windings, at least one bias winding associated with one of said sets of opposite reactance windings, means for impressing a voltage across one set of opposite corners of the bridge circuit for providing a variable voltage across the other set of opposite bridge corners in accordance with the balance of the bridge circuit, a source of single-polarity current, means for connecting the input windings associated with both sets of reactance windings to said source of single-polarity current, means for supplying bias current to said bias winding so that the reactance of said one set of reactance windings is at a low reactance value relative to the reactance of the other set of reactance windings when said single-polarity current is at a predetermined minimum value, said bias winding being related to produce magnetic effects in opposition to the magnetic effects produced by said input winding associated with said one set of reactance windings, and means for varying said single-polarity current to inversely vary the reactance of said two sets of reactance windings.

10. A four-arm bridge circuit comprising saturable core reactor means including an A.C. reactance winding in each arm of the bridge circuit to provide first and second sets of opposite reactance windings and first and second sets of opposite bridge corners, at least one D.C. input winding associated with each of said first and second sets of opposite reactance windings, at least one D.C. bias winding associated with said second set of reactance windings, means for impressing an A.C. voltage across said first set of opposite bridge corners to provide a variable voltage across said second set of opposite bridge corners in accordance with the balance conditions of the bridge circuit, and means for inversely varying the reactances of said first and second sets of reactance windings to control the balance conditions of the bridge circuit, said latter means comprising a source of variable single-polarity current, means connecting the D.C. input windings associated with said first and second sets of reactance windings to said source of single-polarity current, means for supplying D.C. current to said bias winding so that the reactance of said second set of reactance windings is lower than the reactance of said first set of reactance windings for values of said single-polarity current below a predetermined value and higher than the reactance of said first set of reactance windings for values of said single-polarity current above said predetermined value, and means for varying said single-polarity current above and below said predetermined value.

11. A voltage control system comprising a first voltage source connected to supply power to a load circuit, a second voltage source, a reactor control device having an output circuit connected in series circuit relation with said first voltage source, said control device including a pair of saturable core reactors connected to said second voltage source for providing a variable voltage at said output circuit in accordance with the relative reactance values of said reactors, each of said reactors having an input winding, one of said reactors having a bias winding, and means for inversely varying the reactance of said reactors, said means comprising a source of variable single-polarity current connected to both of said input windings, a source of direct current connected to said bias winding to bias said one reactor so that the reactance of said one reactor is lower than the reactance of the other of said reactors when said single-polarity current is below a predetermined value and higher than the reactance of said other reactor when said single-polarity current is above said predetermined value, and means for varying said single-polarity current above and below said predetermined value.

12. An electrical supply system comprising a power output circuit, a power input circuit connected to an A.C. voltage source for supplying power to the power output circuit, a bridge circuit having bridge input and output circuits and including a pair of saturable core reactors each having an A.C. reactance winding and a D.C. input winding, means for biasing only one of said reactors, said means including a bias winding associated with said one reactor, said A.C. windings being connected respectively in adjacent arms of the bridge circuit, means for impressing an A.C. voltage across said bridge input circuit, means coupling said bridge output circuit in series with said power input circuit, and means for inversely varying the reactance of said reactors including a condition responsive device for producing a signal responsive to variations in an electrical condition of the system, a single-ended amplifier having an output circuit coupled to said input windings for supplying single-polarity current to said input windings, amplifier control means coupled to said device for controlling said single-polarity current in response to said signal, and a source of D.C. current connected to supply current to said bias winding such that the reactances of said reactors are equal and the bridge circuit balanced when said single-polarity current is at a predetermined value and unbalanced in one sense when said single-polarity current is above said predetermined value and unbalanced in the opposite sense when said single-polarity current is below said predetermined value.

13. A four-arm bridge circuit comprising saturable core reactor means including an A.C. reactance winding in each arm of the bridge circuit to provide first and second sets of opposite reactance windings and two sets of opposite bridge corners, at least one D.C. input winding associated with each of said first and second sets of opposite reactance windings, at least one D.C. bias winding associated with said second set of reactance windings, means for impressing an A.C. voltage across one of said sets of opposite bridge corners to provide a variable voltage across the other of said sets of opposite bridge corners in accordance with the balance conditions of the bridge circuit, and means for inversely varying the reactance of said first and second sets of reactance windings to control the balance conditions of the bridge circuit, said latter means comprising a condition responsive single-ended amplifier having an output circuit connected to supply single-polarity current variable above and below a predetermined value to both of said input windings, means for supplying D.C. current to said bias winding so that the reactance of said second set of opposite reactance windings is lower than the reactance of said first set of reactance windings for values of said single-polarity current below said predetermined value and higher than the reactance of said first set of reactance windings for values of said single-polarity current above said predetermined value.

14. An electrical control apparatus comprising a four-arm bridge circuit having bridge input and output terminals and including a first saturable core reactor connected in one arm of the bridge circuit, a second reactor connected in an adjacent arm of the bridge circuit, and impedance means connected in each of the other adjacent arms of the bridge circuit, each of said reactors having input winding means, means providing a constant biasing M.M.F. to said first reactor only to bias the same and effect a relatively low reactance value thereof compared to the reactance value of said second reactor in the absence of current flow in said input winding means, means for impressing a voltage across the bridge input terminals, and means for controlling the balance of the bridge circuit to provide a variable voltage at the bridge output terminals, said last named means comprising a source of single-polarity current connected to said input winding means of both of said reactors, said input winding means of said first reactor being connected to provide M.M.F.'s in opposition to said constant M.M.F. in said first reactor, and means for varying said current through a range of values above and below a predetermined value to unbalance said bridge circuit in one sense when said control current is at a value above said predetermined value and unbalance said bridge circuit in the opposite sense when said control current is below said predetermined value.

15. An electrical control apparatus comprising a four-arm bridge circuit having bridge input and output terminals and including a pair of saturable core reactors connected in adjacent arms of the bridge circuit, and a pair of impedances respectively connected in the other adjacent arms of the bridge circuit, said reactors having input winding means, one of said reactors having bias winding means, means for impressing a voltage across the bridge input terminals, and means for controlling the balance of the bridge circuit to permit unbalancing of the bridge circuit in one or the other of opposite senses and the voltage at the bridge output terminals in response to a variable condition comprising means for supplying current of constant value to said bias winding to bias said one reactor to a low reactance value relative to the reactance value of said other reactor, a single-ended amplifier having an output circuit connected to supply single-polarity current to said input winding means to inversely affect the reactance values of said reactors, and amplifier control means responsive to variations in said variable conditions for controlling the value of said single-polarity current between predetermined minimum and maximum values, said input winding means being related to said bias winding means to produce magnetic effects in opposition to the magnetic effects of said bias winding means in said one reactor, the reactances of said one reactor and said other reactor being at predetermined minimum and maximum values, respectively, when said single-polarity current is at said predetermined minimum value.

16. An electrical control apparatus comprising a four-arm bridge circuit having bridge input and output terminals, a pair of impedance devices connected respectively in two adjacent arms of the bridge circuit, a pair of saturable core reactor means including a pair of reactance windings connected respectively in the other two adjacent arms of the bridge circuit, input winding means associated with said pair of reactor means, bias winding means associated with one of said reactor means, means for impressing an A.C. voltage across the bridge input terminals, and means for controlling the balance of the bridge circuit to provide a variable A.C. voltage at the bridge output terminals, said last named means comprising means for supplying a direct current of substantially constant magnitude to said bias winding means to bias said one reactor means, a single-polarity D.C. source of control current connected to said input winding means to affect the reactance of both of said reactance windings, said control winding means and said bias winding means being related to produce opposing magnetic effects in said one reactor means, the reactance values of the reactance windings of said one reactor and the other of said reactors being respectively at predetermined minimum and maximum values when said control current is at a minimum value, and means for varying the magnitude of said control current to effect an unbalance of the bridge circuit in one sense when said control current is below a predetermined magnitude and effect an unbalance of the bridge circuit in the opposite sense when said control current is above said predetermined magnitude.

17. An electrical control apparatus comprising a four-arm bridge circuit having bridge input and output terminals and including a pair of saturable core reactors connected in adjacent arms of the bridge circuit, and a pair of impedances connected respectively in the other two adjacent arms of the bridge circuit, means for impressing A.C. voltage across the bridge input terminals to provide an A.C. voltage across the bridge output terminals which is variable in accordance with the balance of the bridge circuit, only one of said reactors being biased, means for biasing said one reactor including a bias winding on said one reactor, and means for supplying a constant direct current of one polarity only to said bias winding, and means for controlling the balance of the bridge circuit to permit unbalancing of the bridge circuit in either of opposite senses, said last named means including a pair of input windings on said pair of reactors, respectively, a source of current connected to both of said input windings to supply control current of one polarity only to both of said input windings to effect the reactance of said pair of reactors in opposite senses, said bias winding and said input winding of said one reactor being related to produce magnetic effects in opposition in said one reactor, and means for varying the magnitude of said control current to effect an unbalance in bridge circuit in one sense when said control current is below a predetermined magnitude and effect an unbalance of the bridge circuit in an opposite sense when said control current is above said predetermined magnitude.

References Cited in the file of this patent
UNITED STATES PATENTS

| | | |
|---|---|---|
| 2,118,440 | Logan | May 24, 1938 |
| 2,691,130 | Ingersoll | Oct. 5, 1954 |
| 2,792,541 | Markow | May 14, 1957 |
| 2,892,146 | Malsbary | June 23, 1959 |
| 2,931,968 | Hilker | Apr. 5, 1960 |